UNITED STATES PATENT OFFICE.

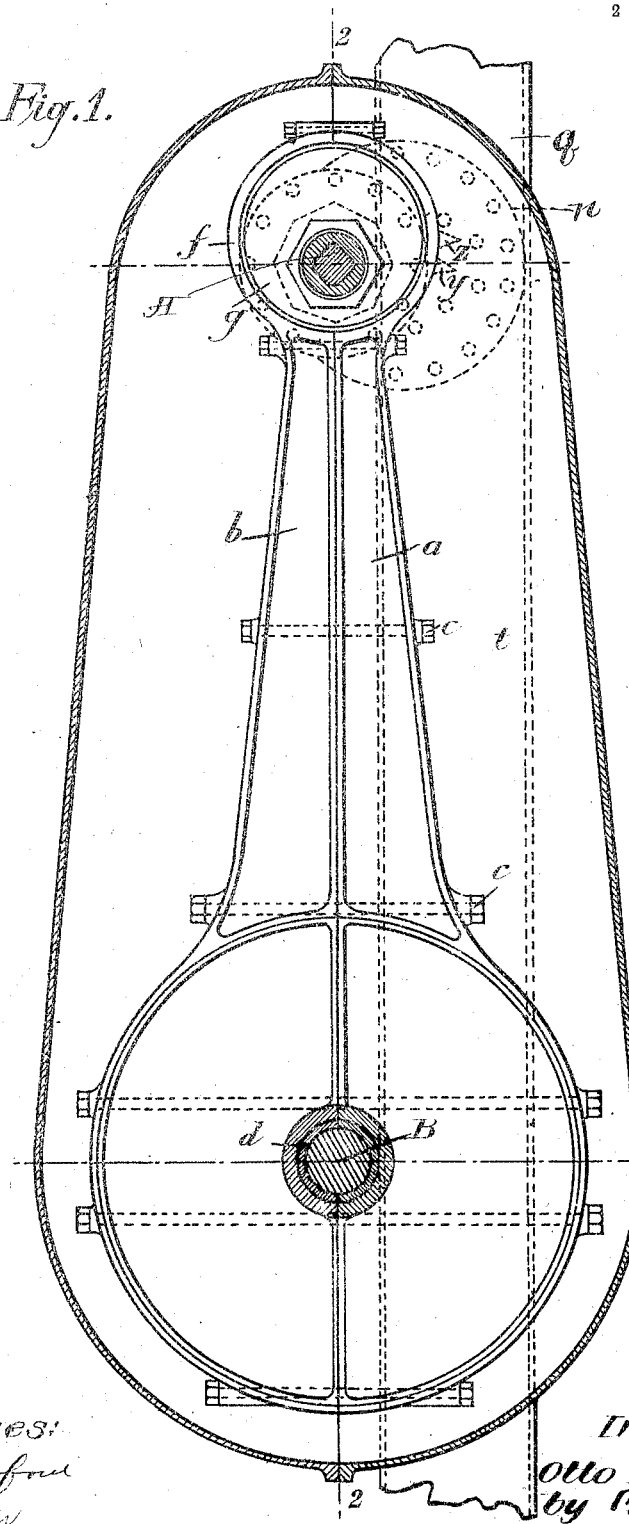

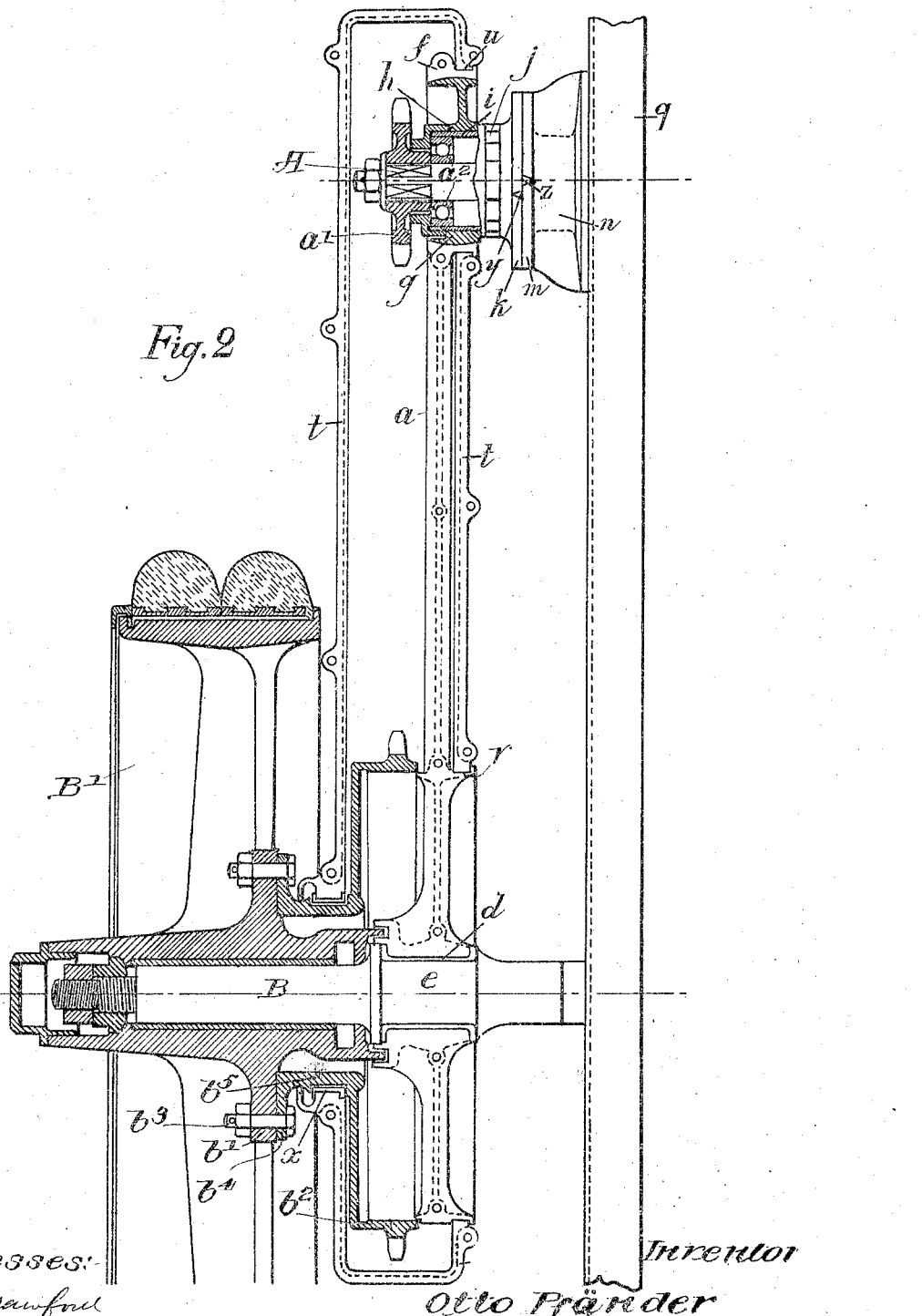

OTTO PFÄNDER, OF BRUSSELS, BELGIUM.

GEAR-CASE FOR MOTOR-VEHICLES, &c.

No. 845,814.　　　Specification of Letters Patent.　　　Patented March 5, 1907.

Application filed September 15, 1905. Renewed January 31, 1907. Serial No. 355,137.

*To all whom it may concern:*

Be it known that I, OTTO PFÄNDER, a subject of the German Emperor, residing at Brussels, in the Kingdom of Belgium, have invented certain new and useful Improvements in or Relating to Gear-Cases for Motor-Vehicles and the Like.

This invention relates to an improved casing for inclosing the power-transmission devices of automobiles, bicycles, and the like, and has for its object the provision of a rigid casing of this character adapted to be mounted upon operating and revoluble parts of the mechanism and permitting adjustment of the transmission device.

In the drawings, Figure 1 is a longitudinal section of a casing embodying the main features of my invention. Fig. 2 is a sectional view taken on line 2 2 of Fig. 1.

As shown in the drawings, A designates the driving-shaft, and B the driven shaft, of an automobile on which is mounted a supporting-wheel B'. The hub of said wheel B' is provided with a flange $b'$, to which is secured one of the sprocket-wheels $b^2$ by means of bolts $b^3$ passing through a flange $b^4$. Between the flange $b^4$ and the main body of the wheel $b^2$ is provided a cylindrical portion $b^5$, adapted to receive one side of the improved casing in a manner to be hereinafter described. On the driving-shaft A is mounted a sprocket-wheel $a'$ and one member of a ball-bearing $a^2$, the other member of which is seated in a flange $i$, which latter is in turn rigidly secured in the bore of the hub $h$ of a revoluble member $g$. Said member $g$ is provided with an extension having a polygonal portion $j$ and a flange $k$. Said flange $k$ abuts against and is preferably of the same diameter as the flange $m$ of a bearing $n$, which latter is rigidly secured to the frame $q$ of the vehicle. The bore of said revoluble member is eccentrically disposed with respect to its periphery, so that when a wrench is applied to the polygonal portion $j$ to turn the revoluble member the shafts A and B are adjusted relatively to each other. This adjustment is effected by means of a tension-rod, preferably comprising two split portions $a$ and $b$, the forward ends of which have a receiving-bearing $f$ for the revoluble member $g$ and the rearward ends being mounted at $d$ upon a part $e$ of the driven shaft B. The tension-rod is preferably rigid, so that as the revoluble member is adjusted the shafts A and B are displaced. Indexes $z$ and $y$ are mounted on the flanges $m$ and $k$, respectively, to indicate the relative position of the two flanges.

Any suitable means may be employed to anchor the revoluble member $g$ in its adjusted positions—such, for instance, as is shown in my copending application filed September 15, 1905, Serial No. 278,600.

The casing comprises inner and outer walls, the inner wall $t$ being mounted upon a case-bearing shoulder $u$ at the forward end and upon a similar case-bearing shoulder $v$ at the rearward end of the tension-rod. The outer wall of said casing overhangs the shaft A and bears upon the cylindrical portion $b^5$ of the rear sprocket-wheel, which bearing member may, if desired, be provided with packing $x$. The tension member is clamped in place by bolts $c$. From the foregoing it will be obvious that the construction herein set forth provides for any desired adjustment of the tension member without in any way affecting the casing inclosing the same.

I declare that what I claim is—

1. A casing for transmission devices comprising in combination, an axle, a driving-shaft, a spacing or tension rod revolubly mounted on said axle and provided with an annular case-bearing shoulder concentric with said axle, the opposite end of said rod being revolubly mounted on said shaft and provided with an annular case-bearing shoulder, and a casing mounted on said shoulders.

2. A casing for transmission devices comprising in combination, an axle, a driving-shaft, a spacing or tension rod revolubly mounted on said axle and provided with an annular shoulder concentric with the axle, the opposite end of said rod carrying a revolubly-mounted member eccentrically apertured and adapted to receive the driving-shaft and also provided with an annular shoulder concentric with said member, a casing mounted on said shoulders and adapted to close said device, and means for effecting adjustment of the revoluble member.

3. A device of the class described comprising in combination an axle, a driving-shaft, spacing or tension means for said shaft and axle, and a casing mounted on said tension means.

4. A device of the class described comprising in combination an axle, a driving-shaft, spacing or tension means for said shaft and axle having case-bearing shoulders, and a casing mounted on said shoulders.

5. A device of the class described comprising in combination an axle, a driving-shaft, spacing or tension means for said shaft and axle, said means comprising a revoluble adjusting member, said tension means having case-bearing shoulders, and a casing for said shoulders.

In testimony whereof I affix my signature in presence of two witnesses.

OTTO PFÄNDER.

Witnesses:
S. DARETTE,
GREGORY PHELAN.